United States Patent
Liao et al.

(10) Patent No.: US 9,970,823 B2
(45) Date of Patent: May 15, 2018

(54) METHOD FOR DISPLAYING DIFFERENT TEMPERATURES BY ELECTRONIC THERMOMETER AND ELECTRONIC THERMOMETER

(71) Applicant: HANGZHOU SEJOY ELECTRONICS & INSTRUMENTS CO., LTD., Hangzhou (CN)

(72) Inventors: Yan Liao, Hangzhou (CN); Dongzheng Han, Hangzhou (CN); Yunhua Ren, Hangzhou (CN); Xiaosheng Xuan, Hangzhou (CN)

(73) Assignee: Hangzhou Sejoy Electronics & Instruments Co., Ltd., Hangzhou, Zhejiang Province (CN)

( * ) Notice: Subject to any disclaimer, the term of this patent is extended or adjusted under 35 U.S.C. 154(b) by 554 days.

(21) Appl. No.: 14/503,992

(22) Filed: Oct. 1, 2014

(65) Prior Publication Data
US 2016/0003684 A1    Jan. 7, 2016

(30) Foreign Application Priority Data
Jul. 4, 2014    (CN) .......................... 2014 1 0320953

(51) Int. Cl.
*G01K 7/00*    (2006.01)
*G01K 1/00*    (2006.01)
*G01K 1/04*    (2006.01)

(52) U.S. Cl.
CPC .................................. *G01K 1/04* (2013.01)

(58) Field of Classification Search
USPC ............................. 374/170, 162, 208
See application file for complete search history.

(56) References Cited

U.S. PATENT DOCUMENTS

| | | | |
|---|---|---|---|
| 4,730,941 A * | 3/1988 | Levine | G05B 19/10 236/94 |
| 5,829,878 A | 11/1998 | Weiss et al. | |
| 6,043,021 A * | 3/2000 | Manico | G01K 3/04 206/455 |
| 6,591,739 B2 * | 7/2003 | Norcross | A47J 43/283 294/55.5 |
| 7,247,821 B2 * | 7/2007 | Wilsdorf | F24C 7/082 219/445.1 |
| 7,275,866 B2 | 10/2007 | Tseng | |
| 7,290,925 B1 * | 11/2007 | Skjervold | G01K 3/04 116/216 |
| 7,350,973 B2 | 4/2008 | Craig et al. | |
| 7,633,404 B2 * | 12/2009 | Tseng | A61B 5/021 340/331 |

(Continued)

Primary Examiner — Mirellys Jagan
(74) Attorney, Agent, or Firm — Muncy, Geissler, Olds & Lowe, P.C.

(57) ABSTRACT

This invention provides a method for displaying different temperatures by a thermometer and the thermometer. The method includes the following steps of: obtaining a temperature value, determining whether the temperature value is within a first temperature range, if yes, displaying an indicator pointing to a first color mark located outside of a display screen. According to the method for displaying different temperatures by the thermometer and the thermometer in the invention, the use is convenient, the reaction is intuitive, and the manufacturing cost is effectively reduced.

7 Claims, 7 Drawing Sheets

(56) References Cited

U.S. PATENT DOCUMENTS

| | | | | |
|---|---|---|---|---|
| 8,061,891 B2* | 11/2011 | Lin | ............. | G01K 1/14 |
| | | | | 116/216 |
| 8,198,132 B2* | 6/2012 | Galera | ............. | H01L 23/4951 |
| | | | | 438/107 |
| 8,480,297 B2 | 7/2013 | Tanaka | | |
| 2003/0086474 A1* | 5/2003 | Hammarth | ............. | G01K 1/14 |
| | | | | 374/150 |
| 2003/0188677 A1* | 10/2003 | Akers | ............. | G01K 3/04 |
| | | | | 116/216 |
| 2007/0047617 A1* | 3/2007 | Thorne | ............. | G01K 1/02 |
| | | | | 374/163 |
| 2007/0071066 A1* | 3/2007 | Weng | ............. | G01J 5/02 |
| | | | | 374/163 |
| 2009/0175317 A1* | 7/2009 | Chan | ............. | G01J 5/0022 |
| | | | | 374/170 |
| 2011/0043368 A1* | 2/2011 | Lu | ............. | G01K 1/02 |
| | | | | 340/586 |
| 2011/0164654 A1 | 7/2011 | Tanaka | | |
| 2012/0150482 A1* | 6/2012 | Yildizyan | ............. | A61B 5/01 |
| | | | | 702/131 |
| 2014/0203938 A1* | 7/2014 | McLoughlin | ............. | A62C 99/009 |
| | | | | 340/584 |

* cited by examiner

METHOD FOR DISPLAYING DIFFERENT TEMPERATURES BY ELECTRONIC THERMOMETER AND ELECTRONIC THERMOMETER

CROSS-REFERENCE TO RELATED APPLICATIONS

This Non-provisional application claims priority under 35 U.S.C. § 119(a) on Patent Application No(s). 201410320953.6 filed in Republic of China on Jul. 4, 2014, the entire contents of which are hereby incorporated by reference.

BACKGROUND OF THE INVENTION

Field of the Invention

The invention relates to a method for indicating temperatures and, more particularly, to a method for displaying different temperatures by a thermometer and the thermometer using the method.

Description of the Related Art

In a thermometer, a temperature sensor is used to transmit electrical signals, and then a measured or predicted temperature value is displayed on a display screen (such as a liquid crystal display, a digitron display, or an LED array display and so on) in a numerical mode. With the advantages of ease of temperature value reading, shorter measuring time, higher measuring precision, available memory, and buzzing warning, the thermometer gradually replaces the conventional mercury-in-glass thermometer and is widely applied in many occasions such as home or hospital.

Although the thermometer can display the temperature value of a measured human body, a user must remember temperature critical values for dividing three different states: normal state, low fever state, and high fever state, thus to determine whether the human body needs medical treatment. In addition, while the temperature value can be read more easily via the thermometer than the mercury-in-glass thermometer, the temperature value reading is very difficult for people with poor eyesight, particularly for presbyopic elderly people. Therefore, there is short of a thermometer capable of effectively and intuitively reflecting whether the measured human body runs a fever thus to determine whether the medical treatment is needed.

At present, there is a kind of thermometer on the market capable of displaying different states of normal, low fever, and high fever by changing colors of the backlight of the display screen. In detail, the thermometer has two or two groups of LED lamps (one emits green light, and the other emits red light) in a backlight module and additionally has circuits for control, thus to allow the two LED lamps to light singly or together. When the green LED lamp is lit, the display screen displays green color, showing a normal state. When the red LED lamp is lit, the display screen displays red color, showing a high fever state. When the two LED lamps are lit together, the display screen displays yellow color, showing a low fever state. The thermometer intuitively reflects whether the temperature of the measured human body is normal and different fever states by the above-mentioned method.

However, since at least two LED lamps are used as the backlight in this kind of thermometer, the service life thereof is very limit. After the thermometer is used for a period of time, the brightness of the LED lamp may decrease. Particularly, when the color of one LED lamp fades out, the user may be confused about the state displayed by the thermometer, which may cause the user to make a misjudgment and even cause delay of the treatment to the patient. For example, when the LED lamps with two colors are lit together, and the brightness of the green LED lamp apparently decreases due to frequently lightening, the displayed color of the display screen will be partial to the red color, which may cause the user to make a misjudgment and think that the present measured human body runs a high fever.

In addition, compared with other thermometers, this kind of thermometer needs to additionally include the LED lamps in structure. Further, driving circuits are needed to be separately disposed on the circuit to control the two LED lamps to light singly or together, thereby allowing the producing technology to be more complicated and improving the manufacturing cost of the thermometer.

BRIEF SUMMARY OF THE INVENTION

To overcome at least one of the deficiencies of the prior art, this invention provides a method for displaying different temperatures by a thermometer with intuitive display and reduced manufacturing cost and the thermometer using the method.

To achieve the above objective, this invention provides a method for displaying different temperatures by a thermometer. The method includes the following steps of: obtaining a temperature value; determining whether the temperature value is within a first temperature range, if yes, displaying an indicator pointing to a first color mark located outside of a display screen.

In one embodiment of the invention, the first color mark may be printed on a casing of the thermometer, or the first color mark may be printed on a transparent sheet and the transparent sheet may be attached to the display screen of the thermometer.

In one embodiment of the invention, whether the temperature value is within the first temperature range may be determined, if no, the indicator may be displayed, and the indicator may point to a second color mark located outside of the display screen.

In one embodiment of the invention, whether the temperature value is within the first temperature range may be determined, and if no, the indicator may not be displayed.

In one embodiment of the invention, after the step of determining whether the temperature value is within the first temperature range, if the determination is no, the method may further include the following steps of: determining whether the temperature value is within a second temperature range, if yes, displaying the indicator pointing to a second color mark located outside of the display screen.

In one embodiment of the invention, after the step of determining whether the temperature value is within the second temperature range, if the determination is no, the method may include the following steps of: determining whether the temperature value is within a third temperature range, if yes, displaying the indicator pointing to a third color mark located outside of the display screen.

In one embodiment of the invention, the first color mark, the second color mark, and the third color mark may be red, yellow, and green color strips, respectively.

The invention further provides a thermometer using the above method for displaying different temperatures including a casing, a display screen, and a temperature sensor. The temperature sensor is disposed in the casing, and the display screen is disposed on the casing. The thermometer includes a first color mark, and the first color mark is located outside of the display screen.

In one embodiment of the invention, the first color mark may be printed on the casing, or the first color mark may be printed on a transparent sheet and the transparent sheet may be attached to the display screen.

In one embodiment of the invention, the thermometer may further include a second color mark and a third color mark, and the second color mark and the third color mark may be located outside of the display screen. The first color mark, the second color mark, and the third color mark may be red, yellow, and green color strips, respectively.

To sum up, according to the method for displaying different temperatures by the thermometer in the invention, by determining within which temperature range the obtained temperature value is, the indicator is correspondingly displayed, and the indicator points to the corresponding color mark on the thermometer, thereby intuitively and instantly reflecting different temperature states of a user. According to the thermometer in the invention, the color marks corresponding to different temperature ranges are disposed outside of the display screen, without a backlight (such as LED lamps), or just in need of one backlight for clearly seeing the display screen of the thermometer. Thus, the structure is much simplified, the producing technology is simpler, and the manufacturing cost is lower. Further, the circuit of the thermometer is simplified, thereby solving the problem that a driving circuit is especially needed for changing colors of the backlight in the prior art. The thermometer in the invention overcomes the defects in the prior art that the service life of the LED of the thermometer is short and the displaying effect is bad and even incorrect after the thermometer is used for a long time. In the invention, the determining and displaying steps are just added in the program thus to realize color instruction of different temperatures.

Preferably, the color mark may be printed on the transparent sheet of the display screen, thereby simplifying the producing technology, standardizing the manufacture, and greatly reducing the manufacturing cost.

These and other features, aspects, and advantages of the present invention will become better understood with regard to the following description, appended claims, and accompanying drawings.

DETAILED DESCRIPTION OF THE INVENTION

Figure 1:
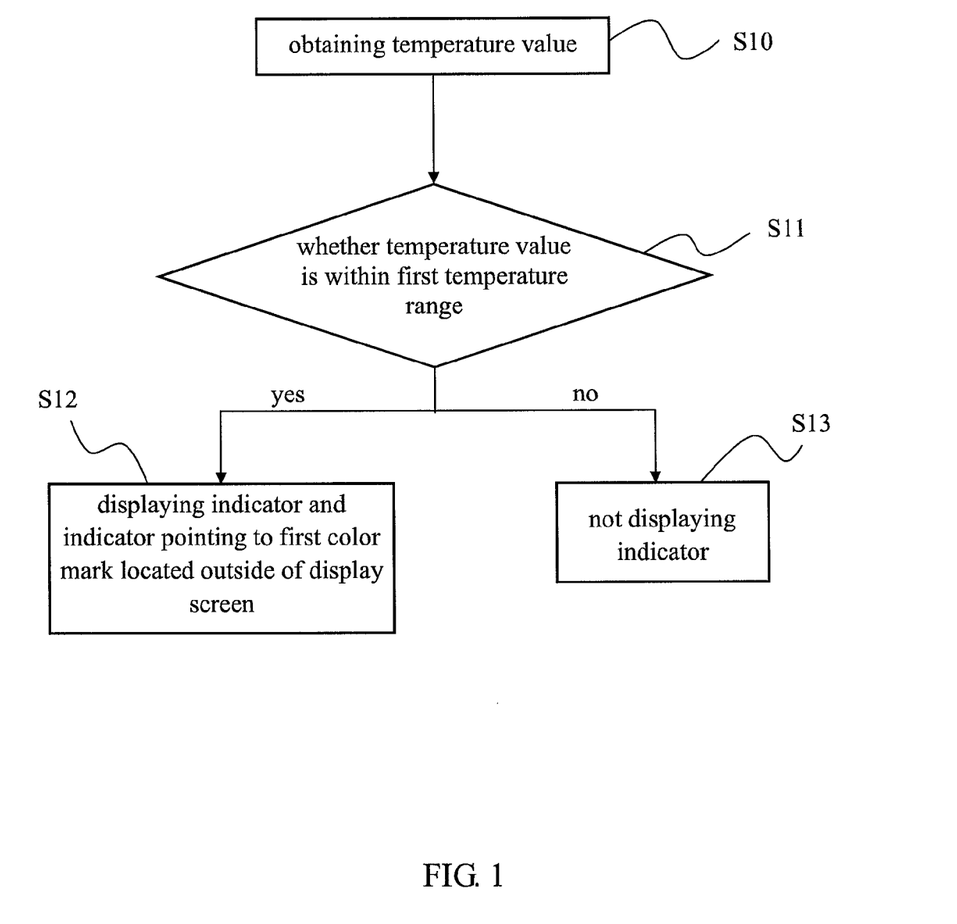
FIG. 1 is a flow chart showing a method for displaying different temperatures by a thermometer according to a first embodiment of the invention.
Figure 2:
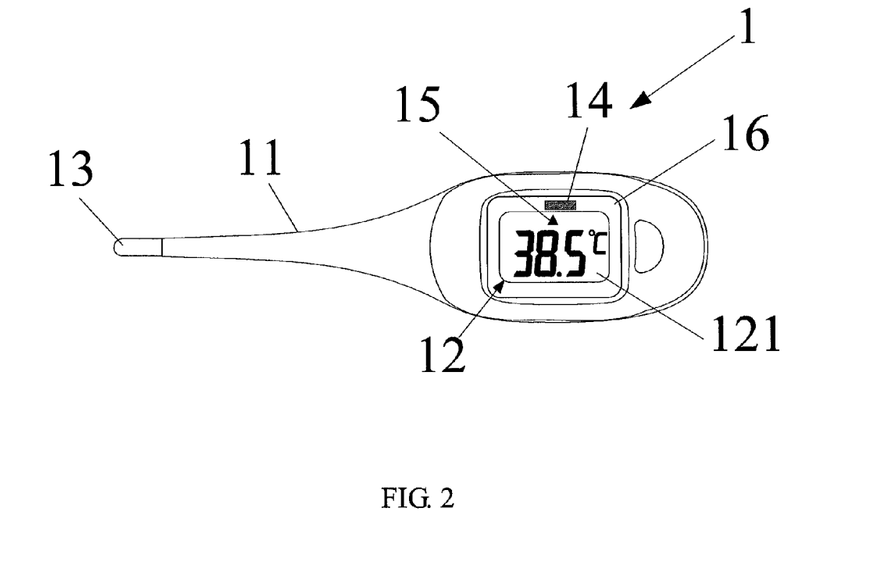
FIG. 2 is a schematic diagram showing the thermometer according to the first embodiment of the invention.

FIG. 1 is a flow chart showing a method for displaying different temperatures by a thermometer according to a first embodiment of the invention. FIG. 2 is a schematic diagram showing the thermometer according to the first embodiment of the invention. Please refer to FIG. 1 and FIG. 2 together.

In the first embodiment, the thermometer 1 includes a casing 11, a display screen 12, and a temperature sensor 13. The temperature sensor 13 is disposed in the casing 11, and the display screen 12 is disposed on the casing 11. The thermometer 1 includes a first color mark 14. The first color mark 14 is located outside of the display screen 12. In the first embodiment, the method for displaying different temperatures by the thermometer in the invention includes step S10, step S11, and step S12 or step S13. The thermometer 1 as shown in FIG. 2 is a digital thermometer. However, this invention does not limit the type of the thermometer.

In step S10, a temperature value is obtained. In detail, the temperature value may be a temperature value measured and obtained by the temperature sensor 13 of the thermometer 1 in real time. When the thermometer 1 is a predicted thermometer, the temperature value may be a predicted final balanced temperature value. The invention does not limit the time or the method for obtaining the temperature value. Preferably, the temperature value is the temperature value to be displayed by the display screen 12 when the thermometer 1 finishes the measurement.

In step S11, whether the temperature value is within a first temperature range is determined. If yes, step S12 is performed. An indicator 15 is displayed, and the indicator 15 points to a first color mark 14 located outside of the display screen 12. If no, step S13 is performed, and the indicator 15 is not displayed. In a detailed application, the first temperature range may be greater than or equal to 38.0° C. When the obtained temperature value is greater than or equal to 38.0° C. (for example, the obtained temperature value is 38.5° C., as shown in FIG. 2), the indicator 15 points to the first color mark 14, representing that the user runs a fever. When the obtained temperature value is smaller than 38.0° C., the indicator 15 is not displayed, representing that the user does not run a fever.

In the first embodiment, the indicator 15 may be triangular in shape, and one corner of the triangle points to the first color mark 14. However, the invention does not limit the shape of the indicator 15. In other embodiments, the indicator 15 may be a diamond, an arrow, or in any shape with an instructing function.

In this invention, "outside of the display screen" refers to a front side of the display screen 12 relative to the backlight side of the display screen 12. In the embodiment, the first color mark 14 is printed on a transparent sheet 16, and the transparent sheet 16 is attached to the display screen 12 of the thermometer 1. In detail, as shown in FIG. 2, the area of the transparent sheet 16 is greater than that of a display area 121 of the display screen 12, and the first color mark 14 is located outside of the display area 121 of the display screen 12. However, the invention is not limited thereto. In other embodiments, after the transparent sheet 16 is attached to the display screen 12, the first color mark 14 may be in the display area 121, as long as the indicator 15 can correctly indicate the first color mark 14.

In actual production, the first color mark 14 may be printed on the transparent sheet 16 via silk screening, thus to form standardized production, thereby greatly reducing the manufacturing cost. The transparent sheet 16 is then attached to the display screen 12, thus to achieve dustproof and waterproof functions. The invention does not limit the disposition of the first color mark 14. In other embodiments, the first color mark 14 may be directly printed on the casing 11 of the thermometer 1. In the embodiment, the first color mark 14 is a red strip. However, the invention does not limit the color and shape of the first color mark 14.

Figure 3:
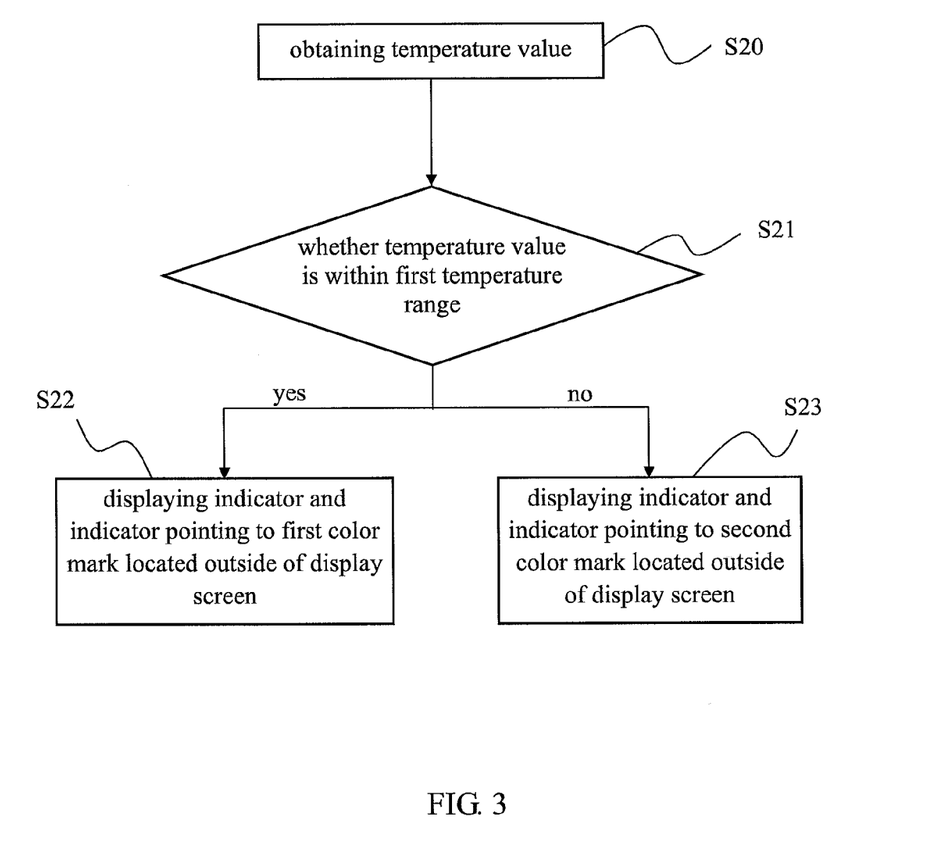
FIG. 3 is a flow chart showing a method for displaying different temperatures by a thermometer according a second embodiment of the invention.
Figure 4:
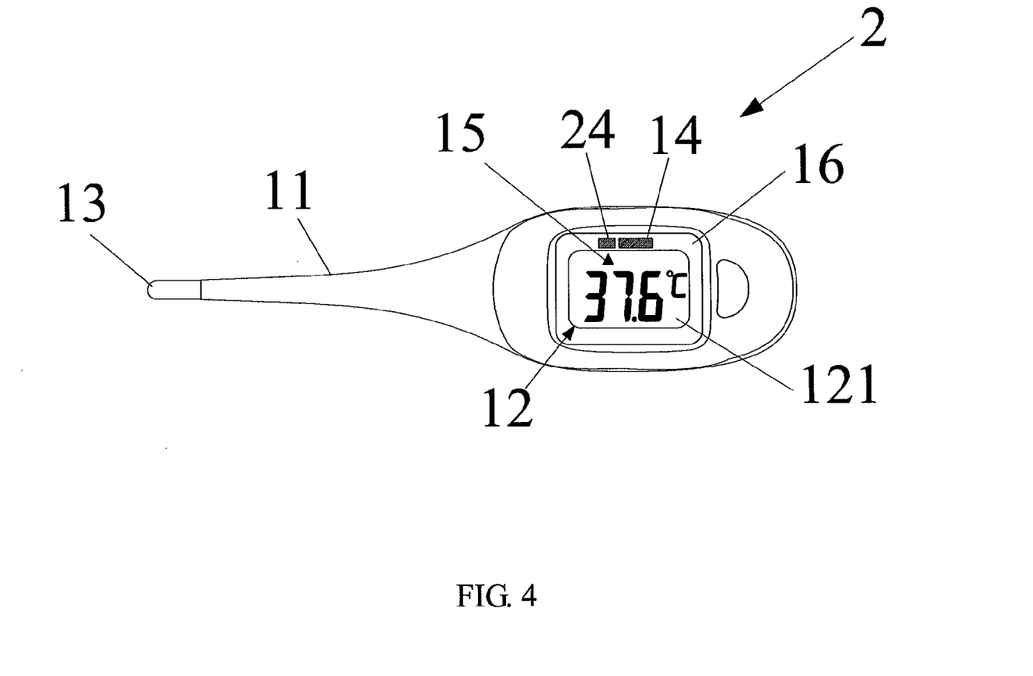
FIG. 4 is a schematic diagram showing the thermometer according to the second embodiment of the invention.

FIG. 3 is a flow chart showing a method for displaying different temperatures by a thermometer according to a second embodiment of the invention. FIG. 4 is a schematic diagram showing the thermometer according to the second embodiment of the invention. Please refer to FIG. 3 and FIG. 4 together.

In the second embodiment, a casing 11, a display screen 12, a temperature sensor 13, a first color mark 14, an indicator 15, and a transparent sheet 16 of a thermometer 2 are the same as those described in the first embodiment. Therefore, they are not described herein for a concise purpose. Only the difference is described hereinbelow.

In the second embodiment, the thermometer 2 further includes a second color mark 24, and the second color mark 24 is located outside of the display screen 12. The first color mark 14 and the second color mark 24 are printed on the casing 11 or printed on the transparent sheet 16, and the transparent sheet 16 is attached to the display screen 12.

In the second embodiment, the method for displaying different temperatures by the thermometer includes step S20, step S21, and step S22 or step S23. Step S20 is the same with step S10. Therefore, it is not described herein for a concise purpose. In step S21, whether a temperature value is within a first temperature range is determined. If yes, step S22 is performed, the indicator 15 is displayed, and the indicator 15 points to the first color mark 14 located outside of the display screen 12. If no, step S23 is performed, the indicator 15 is displayed, and the indicator 15 points to the second color mark 24 located outside of the display screen 12.

In other embodiments, after determining that the temperature value is not within the first temperature range, sequentially whether the temperature value is within the second temperature range may be determined. If yes, the indicator 15 is displayed, and the indicator 15 points to the second color mark 24 located outside of the display screen 12. If no, the indicator 15 is not displayed, or the indicator 15 is displayed, and the indicator 15 points to a third color mark located outside of the display screen. The first temperature range does not overlap the second temperature range.

In a detailed application, the first temperature range may be greater than or equal to 38.0° C. When the obtained temperature value is greater than or equal to 38.0° C., the indicator 15 points to the first color mark 14, representing that the user runs a fever. When the obtained temperature value is smaller than 38.0° C. (for example, the obtained temperature value may be 37.6° C., as shown in FIG. 4), the indicator 15 points to the second color mark 24, representing that the user does not run a fever. In the embodiment, the first color mark 14 may be a red strip, and the second color mark 24 may be a green strip. However, the invention does not limit the colors and shapes of the first color mark 14 and the second color mark 24.

Figure 5:
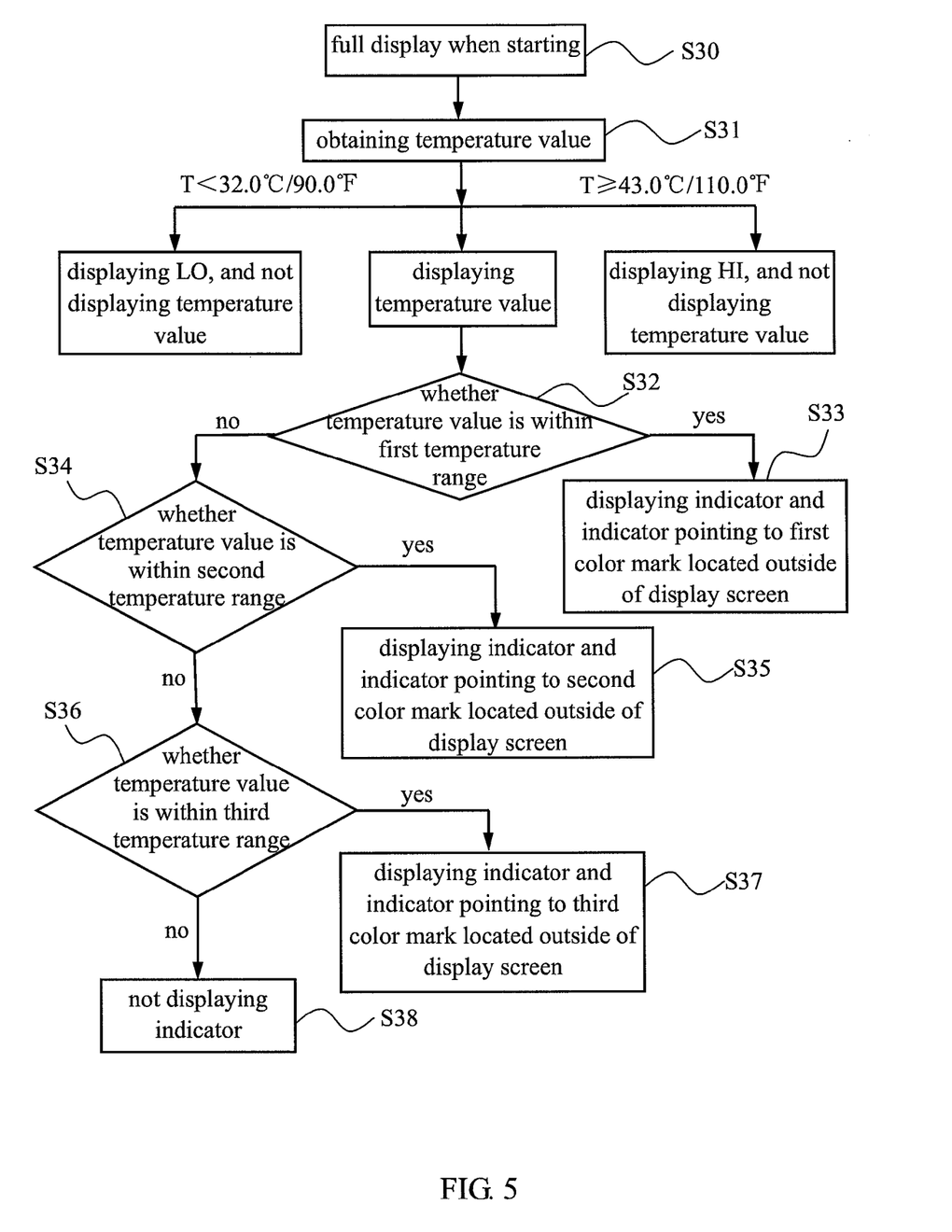
FIG. 5 is a flow chart showing a method for displaying different temperatures by a thermometer according to a third embodiment of the invention.
Figure 6:
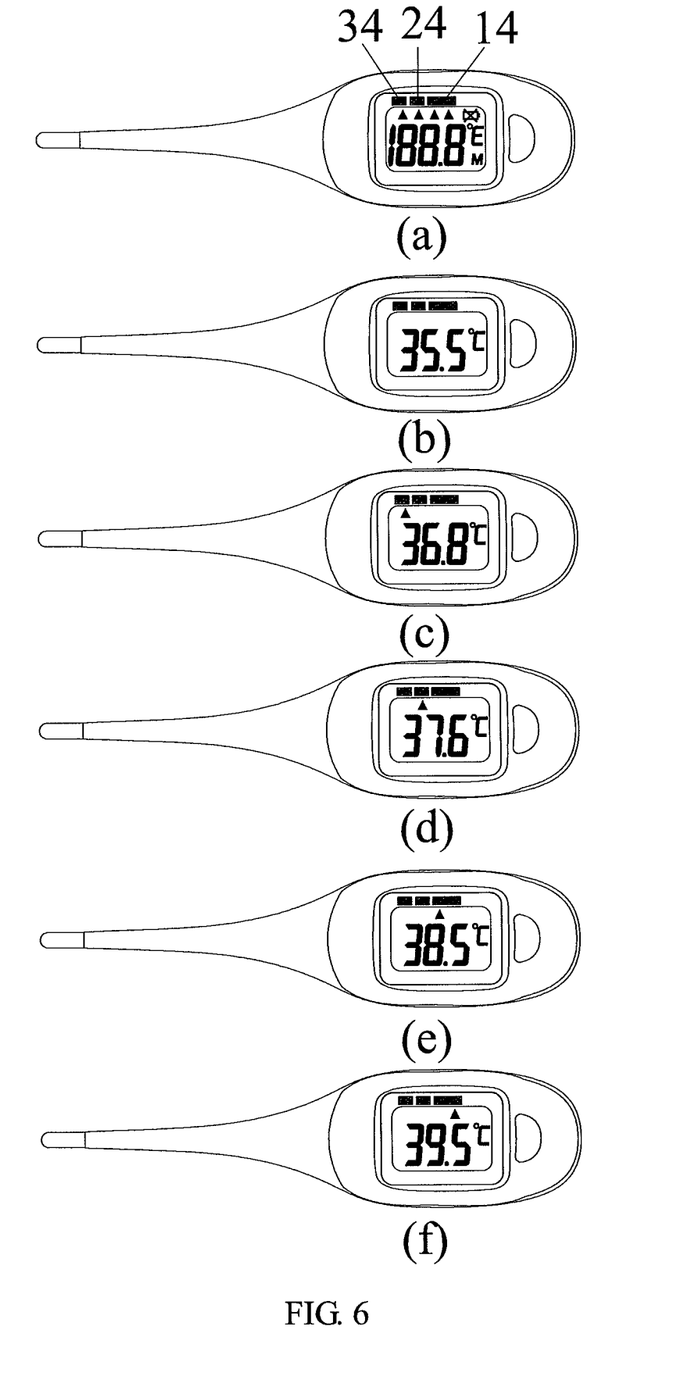
FIG. 6 is a schematic diagram showing different displaying states of the thermometer according to the third embodiment of the invention.

FIG. 5 is a flow chart showing a method for displaying different temperatures by a thermometer according to a third embodiment of the invention. FIG. 6 is a schematic diagram showing different displaying states of the thermometer according to the third embodiment of the invention. Please refer to FIG. 5 and FIG. 6 together.

In the embodiment, in step S30, when a user starts up a thermometer, the display screen of the thermometer may be first fully displayed. The full display interface of the thermometer is shown in FIG. 6(a).

In step S31, the user uses the thermometer to measure and to obtain a temperature value. The obtained temperature value, as described in the first embodiment, may be an actual measured temperature value or may be a predicted final balanced temperature value. In the embodiment, according to characters of the temperature of human body, the display temperature of the thermometer is limited as follows. If the obtained temperature value is within the temperature range 32.0° C.≤T<43.0° C. (or 90.0° C.≤T<110.0° C.), at that moment, the thermometer can display the temperature value. If the obtained temperature value is within the temperature range T≥43.0° C. (or T≥110.0° C.), the thermometer displays HI, and the temperature value is not displayed. If the obtained temperature value is within the temperature range T<32.0° C. (or T<90.0° C.), the thermometer displays LO, and the temperature value is not displayed. In other words, the thermometer can display the temperature value in a certain range. When the temperature value is greater or smaller than the range, the thermometer does not display the temperature value in detail, just displaying related letters. However, the invention is not limited thereto. In a practical application, the temperature range, which can be displayed by the thermometer, can be set according to needs.

In step S32, whether the temperature value is within the first temperature range is determined. If yes, the indicator is displayed, and the indicator points to the first color mark located outside of the display screen (step S33). If no, whether the temperature value is within the second temperature range is determined (step S34). At that moment, if yes, the indicator is displayed, and the indicator points to the second color mark located outside of the display screen (step S35). If no, whether the temperature value is within the third temperature range is determined (step S36). If yes, the indicator is displayed, and the indicator points to the third color mark located outside of the display screen (step S37). If no, the indicator is not displayed (step S38).

In the embodiment, the second temperature range does not overlap the first temperature range, and the third temperature range does not overlap the first temperature range and the second temperature range, respectively. The first temperature range is T≥38.0° C., the second temperature range is 37.4° C.≤T<38.0° C., and the third temperature range is 36.0° C.≤T<37.4° C. In the embodiment, since the range of the temperature value which can be displayed by the thermometer is 32.0° C.≤T<43.0, the first temperature range may be 38.0° C.≤T<43.0° C., and there may further be a fourth temperature range which may be 32.0° C.≤T<36.0° C. However, the invention is not limited thereto. In an actual application, the number of the temperature ranges and the detailed temperature range may be set according to needs of the user.

In the embodiment, the thermometer includes a first color mark 14, a second color mark 24, and a third color mark 34, and the first color mark 14, the second color mark 24, and the third color mark 34 are color marks with different colors. In detail, the first color mark 14, the second color mark 24, and the third color mark 34 may be red, yellow, and green color strips, respectively. However, the invention is not limited thereto. In an actual application, the shape of each color mark may be set according to needs. Each color mark may be set to be in the same other shapes such as a circle, a square, or a triangle, or each color mark may be set to be in different shapes such as a square, a rectangle, or a trapezoid. In addition, the color of each color mark may be set according to needs. The color of each color mark may have gradation. For example, the colors of the color marks may be red of different shades, green of different shades, or yellow of different shades, etc.

In the embodiment, the first temperature range (38.0° C.≤T<43.0° C.) corresponds to the first color mark 14 (the red color strip) for showing a fever state. As shown in FIG. 6(*f*), the temperature value is 39.5° C., and the indicator (the black triangle) points to the red color strip. In addition, when determining the temperature value is within the first temperature range, the thermometer may buzz for reminding the user for attention.

In addition, the second temperature range (37.4° C.≤T<38.0° C.) corresponds to the second color mark 24 (the yellow color strip), for reminding the user that the temperature is higher, showing a low fever state. As shown in FIG. 6(*d*), when the temperature value is 37.6° C., the indicator points to the yellow color strip. When determining the temperature value is within the second temperature range, the thermometer may also buzz for remind the user for attention. However, the invention is not limited thereto.

Furthermore, the third temperature range (36.0° C.≤T<37.4° C.) corresponds to the third color mark 34 (the green color strip), for showing a normal state. As shown in FIG. 6(*c*), when the temperature value is 36.8° C., the indicator points to the green color strip.

In the embodiment, when the temperature value is within the fourth temperature range (32.0° C.≤T<36.0° C.), the indicator is not displayed. As shown in FIG. 6(*b*), when the temperature value is 35.5° C., only the temperature value is displayed, and the indicator is not displayed.

In the embodiment, as shown in FIG. 6, the length of the first color mark 14 is longer than that of the second color mark 24 and the third color mark 34. In detail, the first temperature range (38.0° C.≤T<43.0) can be divided into two first temperature subintervals 38.0° C.≤T≤39.0° C. and 39.0° C.≤T<43.0° C. When the temperature value is within the first temperature subinterval 38.0° C.≤T≤39.0° C., the indicator is displayed and the indicator points to the low side region of the first color mark 14. As shown in FIG. 6(*e*), when the temperature value is 38.5° C., the indicator points to the low side region of the red color strip. When the temperature value is within the first temperature subinterval 39.0° C.<T<43.0° C., the indicator is displayed and the indicator points to the high side region of the first color mark 14. As shown in FIG. 6(*f*), when the temperature value is 39.5° C., the indicator points to the high side region of the red color strip.

Figure 7:
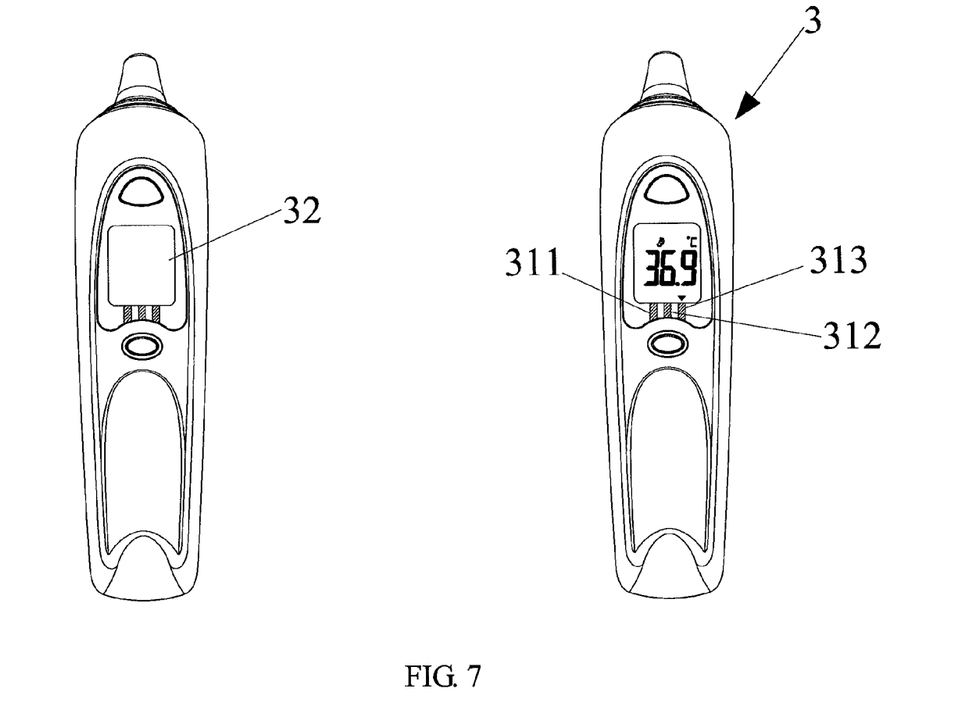
FIG. 7 is a schematic diagram showing a thermometer in different states according to a fourth embodiment of the invention.

FIG. 7 is a schematic diagram showing a thermometer in different states according to a fourth embodiment of the invention. In this embodiment, the thermometer 3 is an ear thermometer. A first color mark 311, a second mark 312, and a third mark 313 are located outside of a display screen 32. The only difference between the ear thermometer 3 and the digital thermometer in the third embodiment lies in that the ear thermometer obtains a temperature value in a non-contact way. For example, the temperature sensor may be an infrared detecting element. However, this invention does not limit the type of the thermometer and the method of obtaining the temperature value. In another embodiment, the thermometer may be a forehead thermometer.

To sum up, according to the method for displaying different temperatures by the thermometer in the invention, by determining within which temperature range the obtained temperature value is, the indicator is correspondingly displayed, and the indicator points to the corresponding color mark on the thermometer, thereby intuitively and instantly reflecting different temperature states of the user. According to the thermometer in the invention, the color marks corresponding to different temperature ranges are disposed outside of the display screen, without the backlight (such as LED lamps), or just in need of one backlight for clearly seeing the display screen of the thermometer. Thus, the structure is simplified, the producing technology is simpler, and the manufacturing cost is lower. Further, the circuit of the thermometer is simplified, thereby solving the problem that a driving circuit is especially needed for changing colors of the backlight in the prior art. The thermometer in the invention overcomes the defects in the prior art that the service life of the LED of the thermometer is short and the displaying effect is bad and even incorrect after the thermometer is used for a long time. In the invention, the determining and displaying steps are just added in the program thus to realize color instruction of different temperatures.

Preferably, the color mark may be printed on the transparent sheet of the display screen, thereby simplifying the producing technology, standardizing the manufacture, and greatly reducing the manufacturing cost.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for displaying different temperatures by a thermometer comprising the following steps of:
   obtaining a temperature value; and
   determining whether the temperature value is within a first temperature range, if yes, displaying an indicator, the indicator pointing to a first color mark located outside of a display screen,
   wherein the first color mark is printed on a casing of the thermometer or printed on a transparent sheet attached to the display screen of the thermometer.

2. The method for displaying different temperatures by a thermometer according to claim 1, further comprising: determining whether the temperature value is within the first temperature range, if no, displaying the indicator, and the indicator pointing to a second color mark located outside of the display screen.

3. The method for displaying different temperatures by a thermometer according to claim 1, further comprising: determining whether the temperature value is within the first temperature range, if no, not displaying the indicator.

4. A method for displaying different temperatures by a thermometer, comprising the following steps of:
   obtaining a temperature value; and
   determining whether the temperature value is within a first temperature range, if yes, displaying an indicator, the indicator pointing to a first color mark located outside of a display screen, wherein if the determination is no, determining whether the temperature value is within a second temperature range, if yes, the indicator is displayed, and the indicator points to a second color mark located outside of the display screen, and if the determination is no, determining whether the temperature value is within a third temperature range, if yes, the indicator is displayed, and the indicator points to a third color mark located outside of the display screen.

5. The method for displaying different temperatures by a thermometer according to claim 4, wherein the first color mark, the second color mark, and the third color mark are red, yellow, and green color strips, respectively.

6. A thermometer comprising a casing, a display screen, and a temperature sensor, the temperature sensor disposed in the casing, the display screen disposed on the casing, wherein the thermometer comprises a first color mark, and the first color mark is located outside of the display screen, wherein the first color mark is printed on the casing or printed on a transparent sheet attached to the display screen.

7. The thermometer according to claim 6, wherein the thermometer further comprises a second color mark and a third color mark, the second color mark and the third color mark are located outside of the display screen, and the first color mark, the second color mark, and the third color mark are red, yellow, and green color strips, respectively.

* * * * *